(12) United States Patent
Longley, Jr. et al.

(10) Patent No.: US 10,320,179 B2
(45) Date of Patent: Jun. 11, 2019

(54) CIRCUIT BREAKERS WITH BACK-FEED PROTECTION

(71) Applicant: Sikorsky Aircraft Corporation, Stratford, CT (US)

(72) Inventors: Robert F. Longley, Jr., Oxford, CT (US); Christopher P. Sullivan, Stratford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 244 days.

(21) Appl. No.: 15/182,337

(22) Filed: Jun. 14, 2016

(65) Prior Publication Data

US 2017/0358916 A1    Dec. 14, 2017

(51) Int. Cl.
*H02H 3/18* (2006.01)
*B60R 16/02* (2006.01)

(52) U.S. Cl.
CPC .............. *H02H 3/18* (2013.01); *B60R 16/02* (2013.01)

(58) Field of Classification Search
CPC .................................. H02H 3/18; B60R 16/02

USPC .......................................................... 307/9.1
See application file for complete search history.

(56) References Cited

U.S. PATENT DOCUMENTS

| | | |
|---|---|---|
| 4,209,814 A | 6/1980 | Garzon |
| 8,941,318 B2 | 1/2015 | Nakajima et al. |
| 9,001,477 B2 | 4/2015 | Hughes |
| 9,240,736 B2 | 1/2016 | Shimomugi et al. |
| 2006/0254893 A1* | 11/2006 | Mills ...................... H01H 71/04 200/313 |
| 2013/0002336 A1* | 1/2013 | Hatsukawa .......... H03K 17/107 327/419 |
| 2015/0210232 A1* | 7/2015 | Kanzaki ................ B60R 16/033 701/36 |

* cited by examiner

*Primary Examiner* — Hal Kaplan
(74) *Attorney, Agent, or Firm* — Cantor Colburn LLP

(57) ABSTRACT

A circuit breaker includes a switch with a supply terminal and a load terminal. A blocking diode is electrically connected in series between the switch and one of the supply terminal and the load terminal. The blocking diode is arranged to oppose current flow between the load terminal and the supply terminal through the switch to prevent current back-flow through the circuit breaker.

14 Claims, 4 Drawing Sheets

CIRCUIT BREAKERS WITH BACK-FEED PROTECTION

BACKGROUND OF THE INVENTION

1. Field of the Invention

The present disclosure relates to electrical systems, and more particularly to current flow control devices for electrical systems.

2. Description of Related Art

Back-feeding occurs when electric power flows in the opposite direction from its usual flow. Power systems typically deliver power by inducing a current with a voltage differential between the power source and a load, the current flowing from the higher potential to the lower potential according to the differential. Back-feeding can occur when the voltage potential between the load and the power source reverses, current thereby flowing from the load to the power source according to the reversed voltage differential.

In aircraft electrical systems, such as in helicopter electrical systems, back-feeding can occur from loads with dedicated load power supply, e.g., backup batteries and volatile memory 'keep alive' batteries. For example, when the electrical load on the electrical system is high during an engine start, or the voltage applied to a load is low due to a power source switchover, the load power supply can back-feed the power source. Back-feeding the power source with the dedicated load power supply can discharge the dedicated load power supply, potentially rending the dedicated load power supply unable to provide power to the load. This can reduce load reliability, such as by erasing volatile memory or rendering organic backup power unavailable.

Such conventional circuit breakers, electrical systems, and methods have generally been considered satisfactory for their intended purpose. However, there is still a need in the art for improved electrical systems. The present disclosure provides a solution for this need.

SUMMARY OF THE INVENTION

A circuit breaker includes a switch with a supply terminal and a load terminal. A blocking diode is electrically connected in series between the switch and one of the supply terminal and the load terminal. The blocking diode is arranged to oppose current flow between the load terminal and the supply terminal through the switch to prevent current back-flow through the circuit breaker.

In certain embodiments, the circuit breaker can have a housing. The blocking diode can be disposed within the housing of the circuit breaker. The supply terminal can extend from the housing interior to the housing exterior. The load terminal can extend from the housing interior to the housing exterior. The blocking diode can be disposed within the footprint of the circuit breaker. The footprint can be standard-sized circuit breaker footprint, such as an MS 3320 circuit breaker footprint. The blocking diode can have an anode and a cathode. The anode can be connected to the load terminal and the cathode can be connected to the switch. The anode can be connected to the switch and the cathode can be connected to the load terminal.

In accordance with certain embodiments, the switch can include a contact. The contact can have an open position and a closed position. The contact can electrically connect the supply terminal with the load terminal in the closed position. The supply terminal can be electrically separated from the load terminal in the open position. It is also contemplated that, in accordance with certain embodiments, the switch can include a solid-state device. The solid-state device can have an electrically-open state and an electrically-closed state. The solid-state switch device can electrically connect the supply terminal with the load terminal in the electrically-closed state. The solid-state switch device can electrically separate the supply terminal from the load terminal in the electrically-open state.

An electrical system includes a circuit breaker as described above. A supply lead is connected to the supply terminal, a load lead is connected to the load terminal, and the blocking diode is arranged to oppose current flow from the load lead to the supply lead. The load terminal can be connected in series between the switch and the load lead. The supply terminal can be connected in series between the switch and the supply lead. A power bus can be connected to the supply lead. A load can be connected to the load lead. The load can have a load power supply which is electrically separated from the supply terminal when the supply terminal is electrically connected to the load terminal. The electrical system can be a vehicular electrical system, such as a rotorcraft electrical system.

A method of controlling current flow includes electrically connecting load terminal and supply terminal of a circuit breaker. A supply voltage is applied to the supply terminal. A load voltage is applied to the load terminal, the voltage applied at the load terminal being greater than the voltage applied at the supply terminal. Current flow is blocked between the load terminal and the supply terminal by the circuit breaker.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
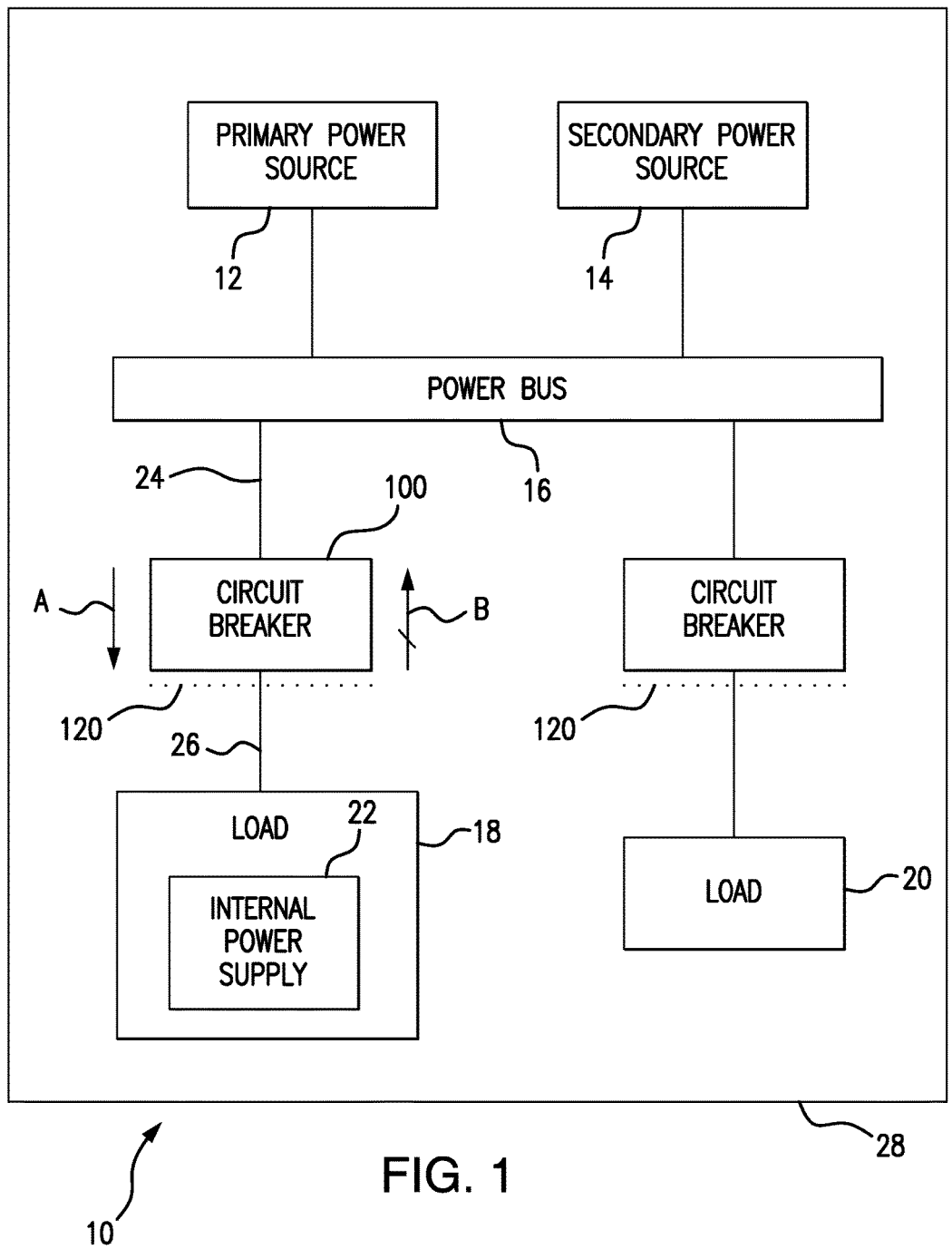
FIG. 1 is a schematic view of an exemplary embodiment of an aircraft electrical system constructed in accordance with the present disclosure, showing a circuit breaker electrically connecting a power bus to a load and preventing current back-flow from the load to the power bus.

Reference will now be made to the drawings wherein like reference numerals identify similar structural features or aspects of the subject disclosure. For purposes of explanation and illustration, and not limitation, a partial view of an exemplary embodiment of a circuit breaker in accordance with the disclosure is shown in FIG. 1 and is designated generally by reference character 100. Other embodiments of circuit breakers, electrical systems, and methods of controlling current flow through circuit breakers in accordance with the disclosure, or aspects thereof, are provided in FIGS. 2-5, as will be described. The systems and methods described herein can be used helicopter rotorcraft electrical systems; however the invention is not limited to a particular type of aircraft or to aircraft in general.

Referring to FIG. 1, an electrical system 10 is shown. Electrical system 10 includes a primary power source 12, a secondary power source 14, and a power bus 16. Electrical system 10 also includes a first electrical load 18 and a second electrical load 20. Primary power source 12 and secondary power source 14 are connected to power bus 16 and are configured for independently providing electrical power to power bus 16. First electrical load 18 includes an internal power supply 22 and is connected to power bus 16 through a circuit breaker 100, a supply lead 24 electrically connecting circuit breaker 100 to power bus 16 and a load lead 26 electrically connecting first electrical load 18 to circuit breaker 100. Internal power supply 22 can include an energy storage device such as a battery and/or a capacitor, and is unisolated. In this respect internal power supply 22 is electrically connected to power bus 16 through circuit breaker 100 when first electrical load 18 is electrically connected to power bus 16. Second electrical load 20 is electrically connected to power bus 16 through one or more leads and/or a circuit breaker. In the illustrated exemplary embodiment, electrical system 10 is carried by a rotorcraft 28 and provides electrical power to one or more electrical loads of rotorcraft 28.

As will be appreciated by those of skill in the art in view of the present disclosure, unisolated electrical loads connected a common power bus and having internal power supplies can back-feed the power bus. For example, internal power supply 22 can back-feed power bus 16 when the voltage on power bus 16 drops below the voltage of internal power supply 22, potentially dissipating electrical energy stored by internal power supply 22. Examples of circumstances where internal power supply 22 could back-feed power bus 16 include switchovers between primary power source 12 and secondary power source 14 and/or operational conditions where power demand on power bus 16 is high, such as during engine start events. Circuit breaker 100 is configured and adapted for one-way connectivity between power bus 16 and electrical load 18. In this respect, when electrically connecting power bus 16 with electrical load 18, circuit breaker 100 only allows current flow in direction A (from power bus 16 to electrical load 18); current flow in direction B (from electrical load 18 to power bus 16) is blocked.

Figure 2:
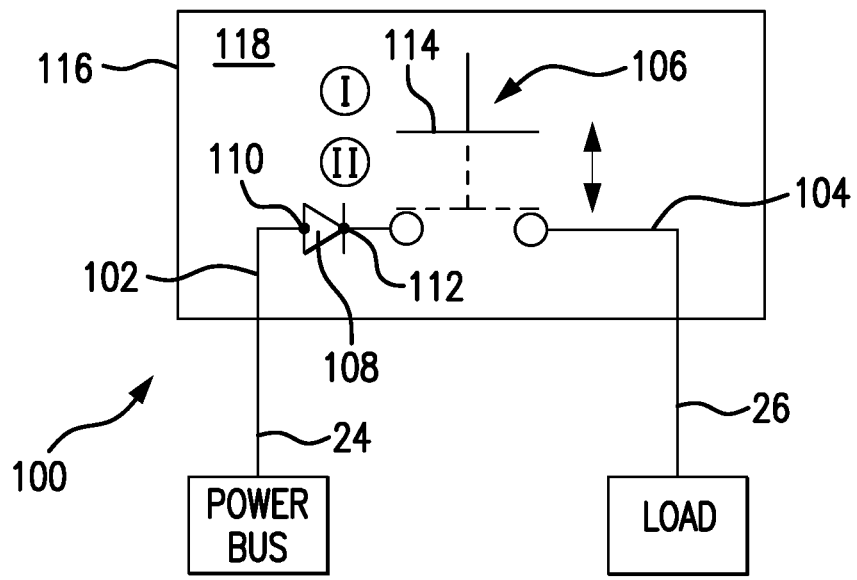
FIG. 2 is a schematic view of the circuit breaker of FIG. 1, showing a diode connected in series between a switch and a supply terminal of the circuit breaker.

With reference to FIG. 2, circuit breaker 100 is shown. Circuit breaker 100 includes a supply terminal 102, a load terminal 104, a switch 106, and a blocking diode 108 contained within a housing 116. In the illustrated exemplary embodiment, blocking diode 108 is connected between supply terminal 102 and switch 106. Blocking diode 108 is arranged to allow current flow from supply terminal 102 to load terminal 104, and to oppose current flow from load terminal 104 to switch 106. The illustrated arrangement allows for a normal flow of electrical current A (shown in FIG. 1) from power bus 16 (shown in FIG. 1) to power to electrical load 18 (shown in FIG. 1), and prevents a current flow B (shown in FIG. 1) from electrical load 18 to power bus 16 in the event that voltage applied to supply terminal 102 drops below a voltage applied to the load terminal 104, thereby not impacting the normal protective function of circuit breaker 100.

Blocking diode 108 is arranged electrically in series between supply terminal 102 and switch 106. An anode 110 of blocking diode 108 is electrically connected to supply terminal 102, and is separated from switch 106 by a cathode 112 of blocking diode 108. Switch 106 includes a mechanical contact 114 with an open position I (shown solid outline) and a closed position II (shown in dashed outline). When mechanical contact 114 is in the open position I, supply terminal 102 is electrically separated from and load terminal 104, and no current flows between supply lead 24 and load lead 26. When mechanical contact 114 is in the closed position II, supply terminal 102 is electrically connected with load terminal 104, and current flows between supply lead 24 and load lead 26. As will also be appreciated by those of skill in the art in view of the present disclosure, electrical communication between supply terminal 102 and load terminal 104 is one-way due to the arrangement of anode 110 and cathode 112, thereby preventing back-flow through circuit breaker 100.

Housing 116 defines an interior 118. Supply terminal 102 and load terminal 104 each extend from the external environment, through a wall of housing 116, and into interior 118. Blocking diode 108 and switch 106 are each disposed within interior 118. It is contemplated that circuit breaker 100 has a footprint 120 corresponding to that of a standard circuit breaker size. For example, it is contemplated that footprint 120 conform MIL-SPEC MS number 3320 circuit breaker. Such conformance simplifies substitution of circuit breaker 100 in power panel assemblies mounting circuit breakers without on-board back feed protection, such as 2TC2-type circuit breakers available from Sensata Technologies Ins. of Attleboro, Mass. As will be appreciated by those of skill in the art in view of the present disclosure, this simplifies the retrofit of existing electrical systems (and aircraft). As will also be appreciated by those of skill in the art in view of the present disclosure, arranging housing 116 with footprint conforming as standard size can reduce the weight of the circuit breaker installation by eliminating additional wiring outside the breaker housing, simplify installation complexity, and/or limit the voltage drop associated with blocking diode 108.

Figure 3:
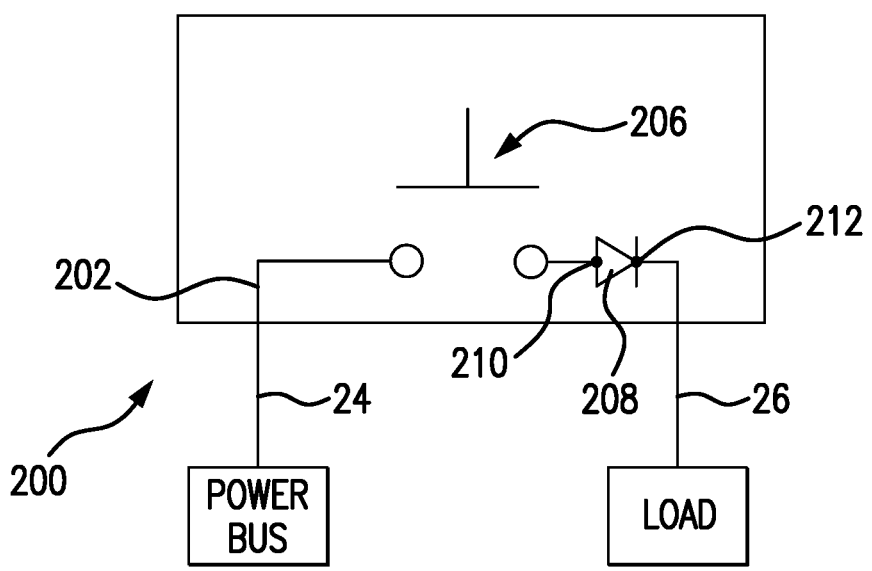
FIG. 3 is a schematic view of the circuit breaker of FIG. 1, showing a diode connected in series between the switch and a load terminal of the circuit breaker.

With reference to FIG. 3, a circuit breaker 200 is shown. Circuit breaker 200 is similar to circuit breaker 100 and additionally includes a blocking diode 208 arranged in series between switch 206 and load terminal 204. In this respect an anode 210 of blocking diode is arranged electrically between a cathode 212 of blocking diode 208 and a switch 206 of circuit breaker 200. Having blocking diode 108 (as shown in FIG. 2) can improve the transient voltage protection afforded by circuit breaker 200 as transient voltages applied to supply lead 24 must first overcome the voltage drop associated with blocking diode 208 prior to application of the transient voltage to load lead 26.

Figure 4:
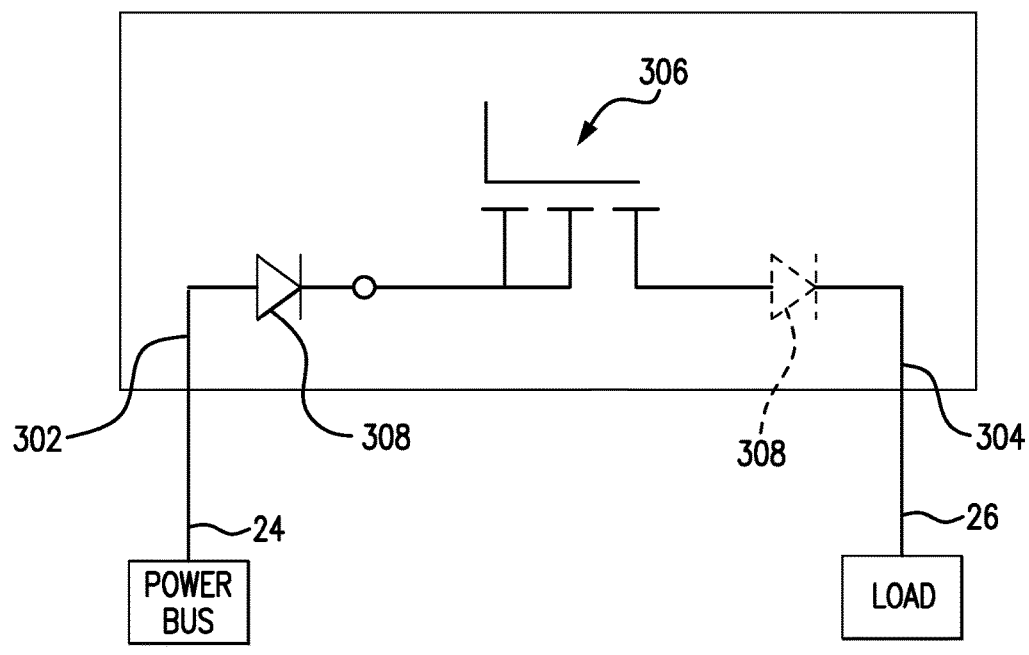
FIG. 4 is a schematic view of the circuit breaker of FIG. 1, showing a circuit breaker having a solid-state switch device and a blocking diode, according to embodiments.

With reference to FIG. 4, a circuit breaker 300 is shown. Circuit breaker 300 is similar to circuit breaker 100 and additional includes a solid-state switch device 306. Solid-state switch device, illustrated in an exemplary way as a MOSFET device, has an electrically-open state and an electrically-closed state. Solid-state switch device 306 electrically separates a supply terminal 302 from a load terminal 304 in the electrically-open state. Solid-state switch device 306 electrically connects supply terminal 302 with load terminal 304 in the electrically-closed state. Although illustrated as a MOSFET device, it is to be understood and appreciated that solid-state switch device 306 can include an IGBT device. It is also to be understood and appreciated that blocking diode 308 can connected in series between supply terminal 302 and solid-state switch device 306 or in series between solid-state switch device 306 and load terminal 304, as suitable for an intended application.

Figure 5:
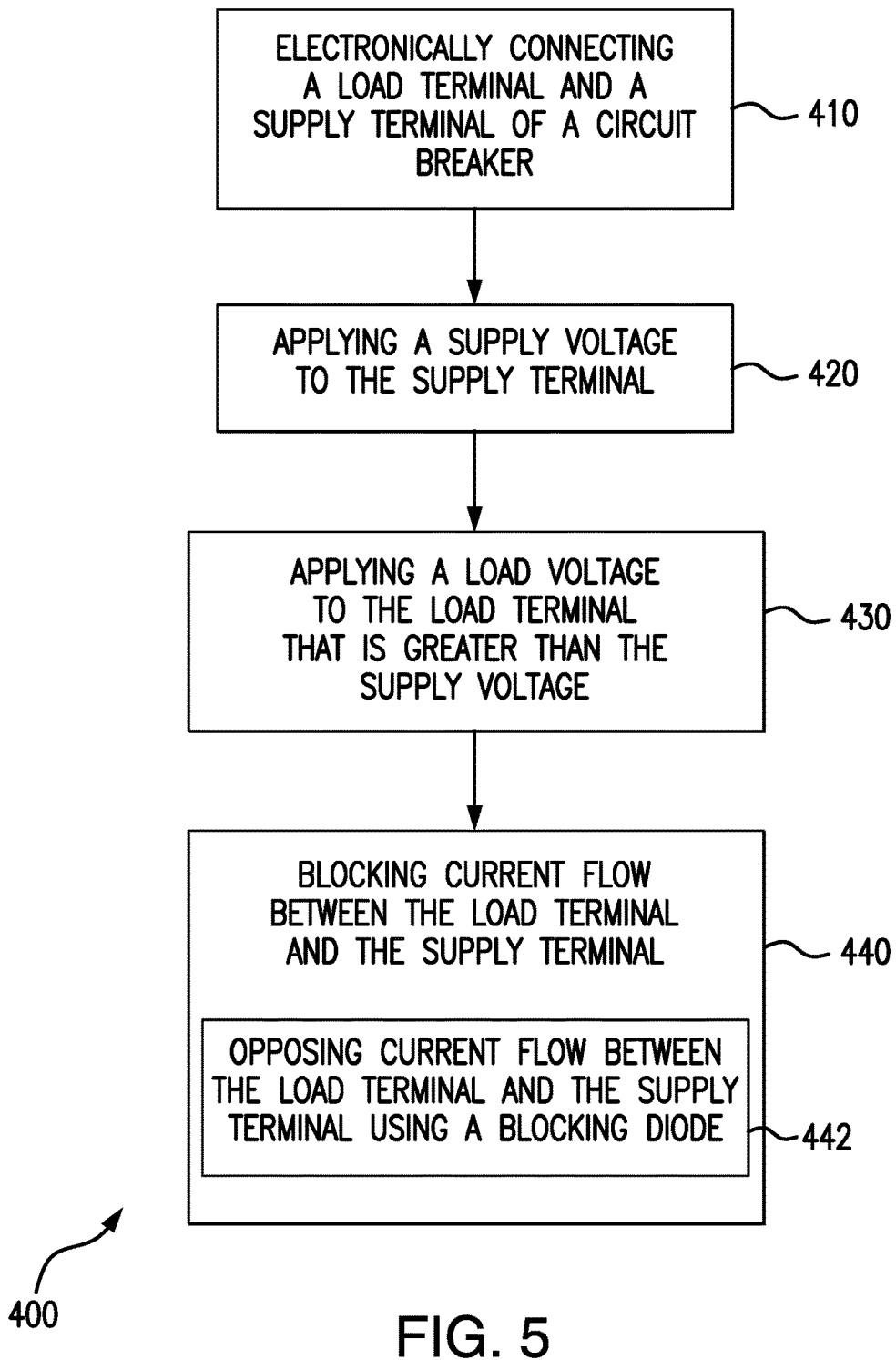
FIG. 5 is flow chart showing a method of controlling current flow through circuit breaker, according to an embodiment.

With reference to FIG. 5, a method of controlling current flow through a circuit breaker is generally indicated with reference numeral 400. Method 400 includes electrically connecting a supply terminal, e.g., supply terminal 102 (shown in FIG. 2), to a load terminal, e.g., load terminal 104 (shown in FIG. 2) of a circuit breaker, e.g., circuit breaker 100 (shown in FIG. 1), as shown with box 410. A supply voltage is applied to the supply terminal, as shown within box 420. A load voltage is applied to the load terminal, e.g., using an internal power supply of a load, that is greater than the supply voltage, as shown with box 430. Current flow from the load terminal to the supply terminal is blocked, as shown with box 440. It is contemplated that the current flow be blocked by a blocking diode, e.g., blocking diode 108 (shown in FIG. 2), connected in series between the load terminal and the supply terminal, as shown with box 442.

The methods and systems of the present disclosure, as described above and shown in the drawings, provide for circuit breakers with superior properties including dual protection with a single component, reduced voltage drop, decreased weight, and simplified installation. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A circuit breaker, comprising:
    a switch with a supply terminal and a load terminal; and
    a blocking diode electrically connected in series between the switch and the load terminal, the blocking diode comprising an anode and a cathode;
    wherein the blocking diode is arranged to oppose current flow from the load terminal to the supply terminal through the switch, thereby preventing current backflow through the circuit breaker;
    wherein:
        the anode is connected to the load terminal and the cathode is connected to the switch, or
        the anode is connected to the switch and the cathode is connected to the load terminal; wherein a load comprising an internal load power supply is coupled to the load terminal.

2. The circuit breaker as recited in claim 1, further comprising a housing, wherein the blocking diode is disposed within the housing.

3. The circuit breaker as recited in claim 2, wherein the supply terminal extends from the housing interior to the housing exterior.

4. The circuit breaker as recited in claim 2, wherein the load terminal extends from the housing interior to the housing exterior.

5. The circuit breaker as recited in claim 1, wherein the switch comprises a mechanical contact with an open position and a closed position, wherein the mechanical contact electrically connects the supply terminal with the load terminal in the closed position, wherein the supply terminal is electrically separated from the load terminal in the open position.

6. The circuit breaker as recited in claim 1, wherein the switch comprises a solid-state device with an electrically-open state and an electrically-closed state, wherein the solid-state switch device electrically connects the supply terminal with the load terminal in the electrically-closed state, wherein the solid-state switch device electrically separates the supply terminal from the load terminal in the electrically-open state.

7. The circuit breaker as recited in claim 1, wherein the blocking diode is disposed within a footprint of the circuit breaker.

8. The circuit breaker as recited in claim 7, wherein the footprint is a MS 3320 footprint.

9. An electrical system, comprising:
    a circuit breaker as recited in claim 1;
    a supply lead connected to the supply terminal; and
    a load lead connected to the load terminal, wherein the blocking diode is arranged to oppose current flow from the load lead to the supply lead.

10. The electrical system as recited in claim 9, wherein the load terminal is connected in series between the load and the blocking diode.

11. The electrical system as recited in claim 9, wherein the supply terminal is connected in series between the supply lead and the blocking diode.

12. The electrical system as recited in claim 9, further comprising a power bus connected to the supply lead.

13. A rotorcraft having an electrical system as recited in claim 9.

14. A method of controlling current flow through a circuit breaker, comprising:
    electrically connecting a load terminal with a supply terminal of a circuit breaker, the circuit breaker comprising a switch;
    applying a supply voltage to the supply terminal;
    applying a load voltage to the load terminal, the load voltage being greater than the supply voltage; and
    blocking current from the load terminal to the supply terminal via a blocking diode, the blocking diode electrically connected in series between the switch and the load terminal, the blocking diode comprising an anode and a cathode;
    wherein:
        the anode is connected to the load terminal and the cathode is connected to the switch, or
        the anode is connected to the switch and the cathode is connected to the load terminal; wherein a load comprising an internal load power supply is coupled to the load terminal.

\* \* \* \* \*